June 13, 1944.   A. J. CASALI   2,351,105
OFFSET KEYWAY GAUGE
Filed Oct. 14, 1943
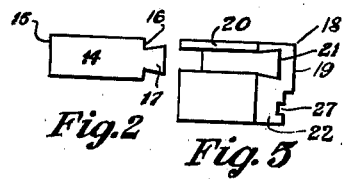
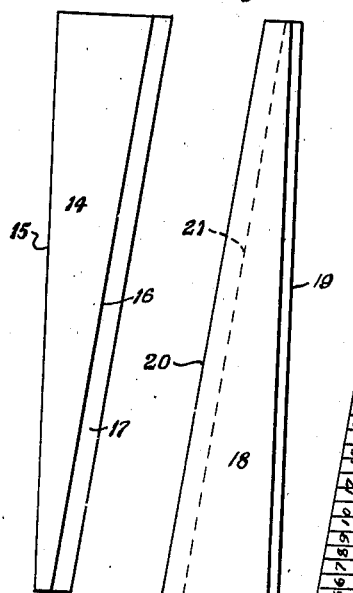
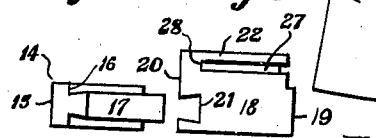
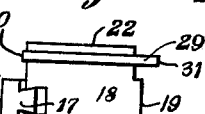
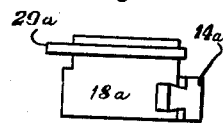
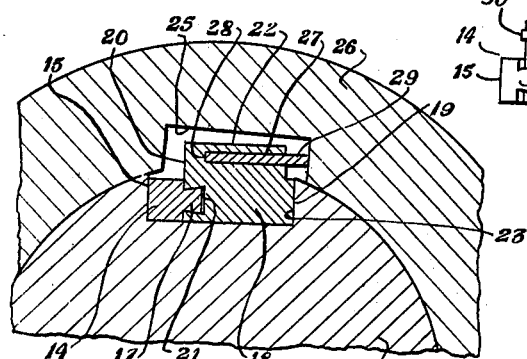
Inventor
Anthony J. Casali
By Frease and Bishop
Attorneys Patented June 13, 1944

2,351,105

UNITED STATES PATENT OFFICE 2,351,105

OFFSET KEYWAY GAUGE

Anthony J. Casali, Canton, Ohio

Application October 14, 1943, Serial No. 506,151

4 Claims. (Cl. 33—162)

The invention relates generally to keyway gauges and more particularly to an improved gauge for accurately measuring an offset between the normally mating keyway portions of two members which are to be keyed together.

Where two members are to be keyed together, as for example a gear or crank arm keyed to a shaft, it is common practice to cut keyways or slots in each of the members, which keyways are lined up to receive a key usually of rectangular cross section. However, in many cases the keyways in the two members do not line up, and the use of the members precludes rotating one member on the other as is ordinarily done in order to line up the keyways. For instance, one member may be a gear which must be secured to the other member or shaft in a fixed position in order to mesh accurately with another gear or rack, or the one member may be a crank arm, the outer end of which must be held in a certain radial position relative to the shaft. In such cases the two members can not be rotated relative to each other for the purposes of lining up the keyways.

Thus in order to save making one of the members over, an offset key is usually made to fit accurately the two keyways which are offset with respect to each other. However, it is difficult to gauge accurately the dimensions for such an offset key, and particularly difficult to gauge the amount of the offset between the two keyways in the members to be keyed together.

It is therefore an object of the present invention to provide a novel and improved gauge for determining accurately the dimensions of an offset key required to key two members together having keyways which do not line up with each other.

Another object is to provied a novel offset keyway gauge which is adapted to measure accurately the widths of offset keyways in two members to be connected together.

A further object is to provide an offset keyway gauge which is adapted quickly to be applied to offset keyways for determining the dimensions of both the keyways and the offsets therebetween, thus saving time and labor.

Another object is to provide an improved offset keyway gauge construction which is equally well adapted to be made for either right or left offsets.

A still further object is to provide a novel offset keyway gauge which is simple, compact and economical of construction.

These and other objects are attained by the parts, improvements and combinations comprising the present invention, which may be stated in general terms as including wedge pieces slidably dovetailed together for endwise movement and having outer parallel gauge faces, one of said wedge pieces having a tapered longitudinal slot in its upper portion slidably receiving a tapered gauge bar which is adapted to extend laterally beyond the gauge face of said wedge piece.

Referring to the drawing herein in which a preferred embodiment of the invention is shown by way of example, Figure 1 is a plan view of one of the wedge pieces embodied in the novel gauge;

Fig. 2 is an end view thereof;

Fig. 3 is an opposite end view thereof;

Fig. 4 is a plan view of the other wedge piece adapted to dovetail with the wedge piece of Fig. 1;

Fig. 5 is an end view thereof;

Fig. 6 is an opposite end view thereof;

Fig. 7 is a plan view of the gauge bar which is slidably received in a slot in the wedge piece of Fig. 4;

Fig. 8 is a plan view of the parts of Figs. 1, 4 and 7 assembled to form a right hand embodiment of the novel offset keyway gauge;

Fig. 9 is an end view thereof;

Fig. 10 is a side view thereof;

Fig. 11 is a plan view of a left hand embodiment of the novel offset keyway gauge;

Fig. 12 is an end view thereof;

Fig. 13 is a fragmentary sectional view showing the right hand gauge of Figs. 8 and 9 inserted into the offset keyway portions of two members to be secured or keyed together.

Similar numerals refer to similar parts throughout the several views of the drawing.

The wedge piece 14 shown detached in Figs. 1, 2 and 3 has a gauge face 15 at right angles to its ends and its opposite side or face 16 is inclined and has a dovetail rib 17 projecting therefrom.

The wedge piece 18 shown detached in Figs. 4, 5 and 6 has a gauge face 19 at right angles to its ends and its opposite side or face 20 is inclined to mate with inclined face 16 of wedge piece 14 and has a dovetail groove 21 for slidably receiving the rib 17.

Thus when the wedge pieces 14 and 18 are slidably engaged by inserting rib 17 endwise into groove 21, the gauge faces 15 and 19 are always parallel during relative endwise movement of the wedge pieces which varies the distance between the gauge faces or the overall width of the wedge pieces.

Preferably the bottom surfaces of wedge pieces 14 and 18 are substantially in the same plane when the two pieces are slidably engaged as shown in Figs. 9 and 13. The upper portion 22 of wedge piece 18 preferably projects above the upper surface of piece 14, the height of piece 14 being slightly less than the depth of the usual keyway 23 provided in a shaft 24 or like member for which the gauge is designed. Thus the upwardly projecting portion 22 projects into the keyway 25 in the member 26 which is to be keyed to the shaft 24, as shown in Fig. 13.

The portion 22 is provided with a longitudinally extending slot 27 parallel with the bottom surface of wedge piece 18 and the inner wall 28 of the slot being inclined to be parallel with the inclined faces 20 and 16. A gauge bar 29 is adapted to be slidably received in said slot 27 and the opposite side edges 30 and 31 are inclined to each other at the same angle as the opposite faces 19 and 20, so that when the edge 30 engages the inner wall 28 of slot 27 the opposite edge 31 is parallel with the gauge face 19. As shown in Fig. 8, as the gauge bar 29 is moved longitudinally in slot 27 with the edge 30 slidably wedgably engaging the inner wall 28 of the slot, the edge 31 of the bar moves laterally relative to wedge piece 18 but said edge 31 is always parallel to the gauge face 19 thereof.

In the operation of the improved gauge if the member 26 when fitted on the shaft 24 does not have its keyway portion 25 lined up with keyway portion 23, and assuming that the member 26 is a gear or crank arm which cannot be rotated on the shaft, then it becomes necessary to make an offset key to fit the offset keyway portions of members 24 and 26 in order to avoid making over one of the members. If the outer member 26 is offset clockwise relative to member 24 as shown in Fig. 13, the right hand gauge shown in Figs. 1 to 10 inclusive is used; if the offset is the other way the left hand gauge shown in Figs. 11 and 12 is used. The left hand gauge comprises the wedge pieces 14a and 18a and gauge bar 29a, which are identical with parts 14, 18 and 29 except that they are of the opposite hand.

In order to determine accurately the dimensions of the offset key required for the keyways 23 and 25, the gauge is inserted as shown in Fig. 13 and the wedge pieces 14 and 18 moved endwise relative to each other until the gauge faces 15 and 19 engage the sides of keyway 23. The gauge bar 29 is then moved lengthwise in slot 27 until its edge 31 projects laterally beyond gauge face 19 and engages the adjacent offset wall of keyway 25. Preferably gauge bar 29 is provided with graduation marks 33 to indicate the relative longitudinal position of the gauge bar 29 when its edge 31 engages keyway 25.

On removing the gauge from the keyway, the amount of offset between the keyways 23 and 25 is easily and quickly determined from the gauge, whereas it will be obvious that the measurement of the exact amount of offset between the keyways is otherwise very difficult and awkward to obtain. If desired the width of the keyways is easily determined by the use of the gauge, merely by measuring the distance between gauge faces 15 and 19 when they engage the sides of the keyway 23.

The improved gauge is simple, compact and economical of construction, as well as being extremely easy to use in saving time and labor.

I claim:

1. An offset keyway gauge including a pair of wedge-shaped pieces slidably engaged at their inner faces for endwise movement and having outer parallel gauge faces, one of said wedge pieces having an upwardly projecting portion and having a tapered longitudinally extending horizontally disposed slot in said upwardly projecting portion, and a tapered gauge bar slidably engaged in said slot, said gauge bar having an outer edge parallel with and adapted to extend laterally beyond the gauge face of said one wedge piece.

2. An offset keyway gauge including a pair of wedge-shaped pieces slidably engaged for endwise movement relative to each other, a gauge bar, and means in an upper portion of one of said wedge-shaped pieces slidably engaging said gauge bar for extending one edge thereof laterally beyond said one wedge-shaped piece as the bar is moved lengthwise therein.

3. A gauge adapted for gauging offset keyway portions of two members to be keyed together, said gauge including two wedge pieces slidably engaging each other for relative endwise movement and having outer gauge faces adapted for engaging the sides of one said keyway portion, and a gauge bar having sliding wedge engagement with one of said wedge pieces for being extended laterally beyond said one wedge piece to engage an offset side of the other said keyway portion.

4. A gauge adapted for gauging offset keyway portions of two members to be keyed together, said gauge including two wedge pieces slidably engaging each other for relative endwise movement and having outer gauge faces adapted for engaging the sides of one said keyway portion, one of said wedge pieces having an upwardly projecting portion, and a gauge bar having sliding wedge engagement with said upwardly projecting portion whereby endwise movement of said gauge bar moves the outer edge thereof laterally beyond said one wedge piece for engaging an offset side of the other said keyway portion.

ANTHONY J. CASALI.